(12) United States Patent
Ye et al.

(10) Patent No.: US 6,624,938 B1
(45) Date of Patent: Sep. 23, 2003

(54) OPTICAL CIRCULATOR

(75) Inventors: Feng Ye, Alameda, CA (US); Ho-Shang Lee, El Sobrante, CA (US)

(73) Assignee: Dicon Fiberoptics, Inc., Richmond, CA (US)

( * ) Notice: Subject to any disclaimer, the term of this patent is extended or adjusted under 35 U.S.C. 154(b) by 22 days.

(21) Appl. No.: 09/881,780

(22) Filed: Jun. 14, 2001

(51) Int. Cl.$^7$ .................................................. G02B 5/30
(52) U.S. Cl. ...................... 359/495; 359/484; 359/494; 359/496; 359/497; 359/498; 385/11; 385/33; 385/36
(58) Field of Search ................................. 359/483, 484, 359/494–498; 385/11, 34, 33, 36

(56) References Cited

U.S. PATENT DOCUMENTS 6,246,807 B1 * 6/2001 Lu et al. ........................ 385/11

FOREIGN PATENT DOCUMENTS

JP         09258135 A    * 10/1997

* cited by examiner

Primary Examiner—Audrey Chang
Assistant Examiner—Craig Curtis
(74) Attorney, Agent, or Firm—Parsons, Hsue & de Runtz LLP (57) ABSTRACT

An optical circulator for transmitting light along a first optical path from a first optical port to a second optical port and along a second optical path from the second optical port to a third optical port, an optical interface in the first and second optical paths that passes the first beam but deflects the second beam to a highly reflective surface, wherein the plane of the highly reflective surface is at an angle to the optical interface such that the second beam is deflected from the highly reflective surface to the third port, and wherein the first port and the third port can be configured to utilize the same GRIN lens.

26 Claims, 5 Drawing Sheets

OPTICAL CIRCULATOR

BACKGROUND OF THE INVENTION

This invention relates in general to optical communication devices, and in particular, to a fiber optic non-reciprocal device which circulates one or more light beams from port to port.

Optical circulators have wide applications. They are used, for example, to convert an existing unidirectional fiber optic communication link to a full duplex communication link by installing an optical circulator at each end of the link. Optical circulators are also used ill fiber amplification systems, wavelength division multiplex (WDM) networks, optical time-domain reflectometers (OTDRs) and for test instruments.

Figure 1A:
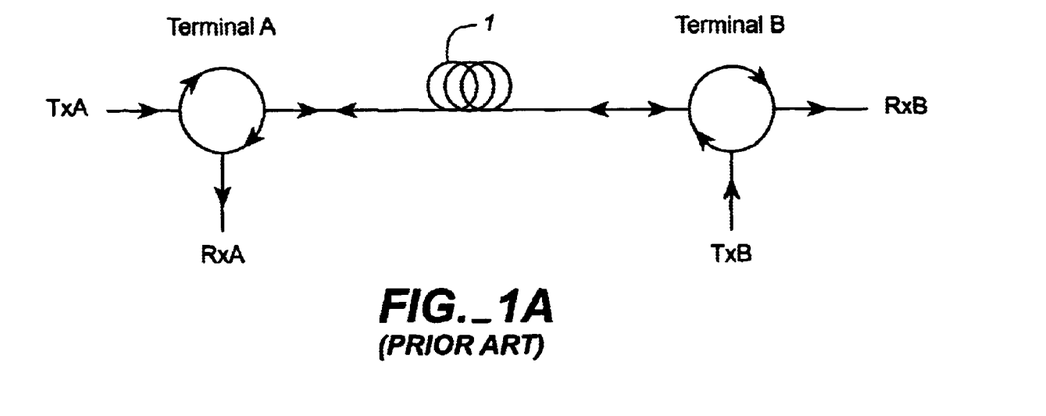
FIGS. 1A and 1B are two figures taken from the above-referenced article by Van Delden to illustrate the function of optical circulators.
Figure 1B:
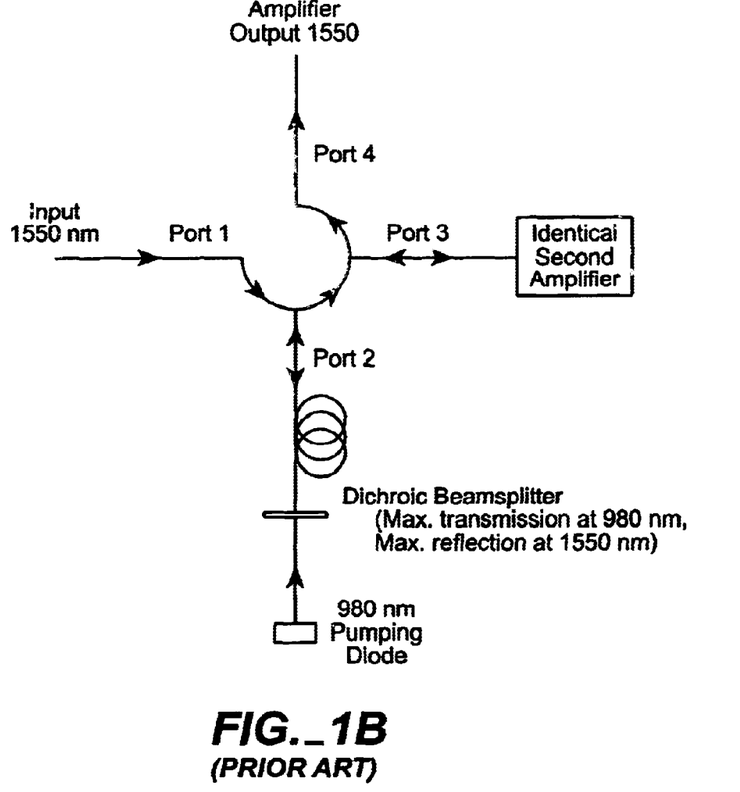

The various applications of optical circulators are described by Jay S. Van Delden in "Optical Circulators Improved by Directional Fiber Systems," Laser Focus World, November 1995, pp. 109–112. Taken essentially from this article by van Delden, FIGS. 1A, 1B illustrate the operation of optical circulators. As shown in FIG. 1A, an optical signal from transmit station TxA is transmitted in a forward path through a circulator at terminal A through an optical link 1 to a receive station RxB through a second circulator at terminal B without the signal being transmitted to the station TxB. An optical signal may be transmitted from station TxB through the circulator at terminal B through the same optical link 1 to a station RxA through the circulator at terminal A in a reverse path, using the same optical link that is used in the forward path, without also transmitting the signal to TxA.

As shown in FIG. 1B, an input optical signal at 1550 nm at port 1 is input to the circulator and transmitted through port 2 and an optical link to a dichroic beamsplitter having a maximum reflection at 1550 nm and maximum transmission at 980 nm. Such signal is therefore reflected, passes through the same optical link and again reaches port 2 of the circulator and is transmitted to port 4 whereupon the signal is amplified. A 980 nm optical signal is applied by a pumping diode rough the dichroic beamsplitter, is passed through the optical link and transmitted from port 2 to port 3 of the circulator to a second amplifier.

Various optical circulators have been used or proposed. U.S. Pat. No. 5,471,340 describes an optical circulator. Such circulator is sensitive to misalignment and has high loss due to the long optical path, and is, therefore, difficult to construct and use.

In "High-Isolation Polarization-Insensitive Optical Circulator for Advanced Optical Communication Systems," *Journal of Lightwave Technology*, Vol. 10, No. 9, September 1992, pp. 1210–1217, Koga et al. describe an optical isolator employing three or more birefringent crystals in an optical array of elements. The one or more birefringent crystals in the center of the array of optical elements in Koga et al.'s optical circulator are used to cause light beams in the reverse direction to deviate from the forward path to direct such beams along a different path. See, for example, FIG. 5(b) on page 1212. To accomplish the function of a circulator, light beams in the reverse path of circulator must deviate adequately from the forward path. However, since the amount of deviation through the circulator depends on the one or more birefringent crystals in the center, and since light is caused to deviate gradually along optical paths through such crystals, such crystals must have adequate optical path lengths. This causes the circulator to be bulky and to have high loss because of the long optical path. In many optical applications, compact devices are called for because of the limited amount of space available.

From the above, none of the devices proposed or in use are entirely satisfactory. It is, therefore, desirable to provide optical circulators with improved characteristics.

SUMMARY OF THE INVENTION

The invention relates to an optical circulator with non parallel interfaces which directs light from port to port. The circulator of the present invention uses a non parallel interface to route light travelling in a forward direction from a first port to a second port while the same non parallel interface routes light travelling in a reverse direction from the second port to a third port. The non parallel interfaces allow for integration of the first and third port so that some of the optical components may be shared by the ports, although the invention may also use ports having completely separate components.

A first embodiment of the invention is exemplified by an optical circulator for transmitting light circularly between input/output ports, comprising a first optical path from a first optical port to a second optical port; a second optical path from the second optical port to a third optical port, wherein a first beam travels along the first optical path and a second beam travels along the second optical path such that the direction of travel of the first beam is opposite of the direction of travel of the second beam; an optical interface in the first and second optical paths that passes the first beam but deflects the second beam to a highly reflective coating, wherein the plane of the highly reflective coating is offset from the plane of the optical interface such that it is not parallel with the optical interface and such that the second beam is deflected from the highly reflective coating to the third port, and wherein the first port and the third port utilize the same GRIN lens. Additionally, the center of the optical interface ranges from about 0.5 to about 3.0 mm from the center of the highly reflective coating. The offset of the plane of the highly reflective coating from the plane of the optical interface is about 2.0 degrees to 5.0 degrees, preferably about 2.4 to 3.3 degrees.

Another embodiment is exemplified by an optical circulation method comprising dividing a light beam from a first port into two substantially orthogonally polarized beams along two different paths, the first port comprising a first lens; causing the two substantially orthogonally polarized beams from the first port to have a fit polarization state; passing the beams having the first polarization state substantially without deflection; combining the two passed light beams originally from the first port into one beam along the same path to a second port, the second port comprising a second lens; dividing a light beam from the second port into two substantially orthogonally polarized beams along two different paths; causing the two substantially orthogonally polarized beams from the second port to have a second polarization state; deflecting at an optical interface the beams having the second polarization state; combining the two deflected beams originally from the second port into one beam along the same path to a third port using the first lens of the first port.

Yet another embodiment involves an optical circulator for transmitting light circularly between input/output ports, comprising first means for receiving a first beam at a first port and transmitting a second beam at a third port; second means for receiving the second beam and transmitting the first beam at a second port; first means for dividing the first beam into two substantially orthogonally polarized beams and for combing the second beam along two different paths into one beam along the same path; second means for dividing the second beam into two substantially orthogonally polarized beams and for combining the first beam along two different paths into one beam along the same path; spatial separation means having a first optical interface in a path or paths between the first and second means for dividing, the spatial separation means causing the first beam to pass substantially without deflection and for causing the second beam to be deflected at said first optical interface to a second optical interface, wherein said second optical interface deflects the second beam to the third port of the first means such that the first means simultaneously receives the first beam at the first port and transmits the second beam at the third port; and means for causing two substantially orthogonally polarized beams from the first beam to have the first polarization state when they reach the spatial separation means and for causing two substantially orthogonally polarized beams from the second beam to have the second polarization state when they reach the spatial separation means.

BRIEF DESCRIPTION OF THE DRAWINGS

For simplicity in description, identical components are labeled by the same numerals in this application.

DETAILED DESCRIPTION OF THE PREFERRED EMBODIMENT

Figure 2:
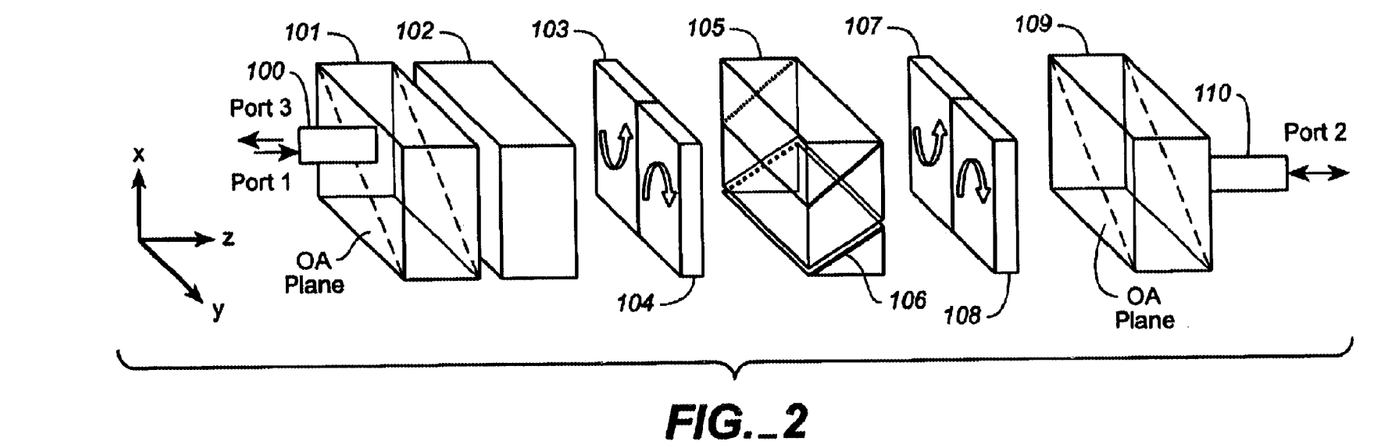
FIG. 2 is a perspective exploded view of the different components of the first embodiment of the optical circulator.
Figure 3:
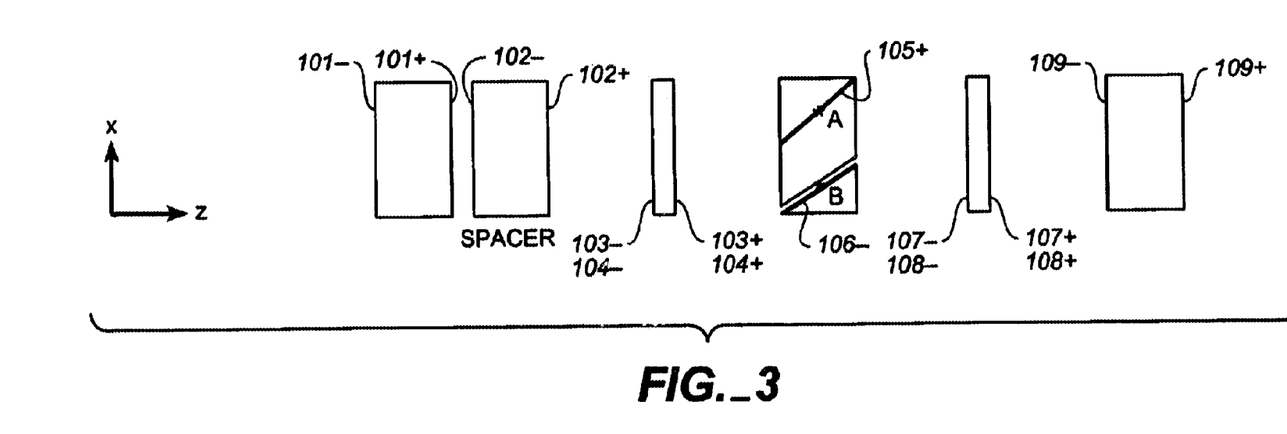
FIG. 3 is a schematic illustration of the first embodiment of the optical circulator viewed from the XZ plane.

FIG. 2 is a three dimensional view of the 3 port circulator illustrating birefringent crystal 101 and 109, Faraday rotator 103, 104, 107 and 108, polarization beam splitter 105, reflection mirror 106, spacer 102, dual fiber collimator 100, and single fiber collimator 110. FIG. 2 is an exploded perspective view of the circulator components, that is, the components are shown separated from one another in a perspective view rather than adjacent to one another. FIG. 3 is the XZ plane view. Optical adhesive can be used to fill the interfaces and bond adjacent optical components in a stacks. Alternatively, an air gap can be kept at the interfaces if each end face of the optical components is coated with an anti-reflective coating.

Dual fiber collimator 100 includes a ferrule holding two single mode fibers together and a quarter pitch GRIN lens. The plane constructed by the two fibers lies on the XZ plane.

Birefringent crystals 101 and 109 have an optical axis on a plane tilted about 45 degrees on the Z axis relative to the YZ plane. The material of the birefringent crystals could be Rutile, YVO4, Calcite, or other similar materials know to those skilled in the art. Spacer 102 has a uniform refractive index. This could be BK-7 glass, specialty glass, or other similar materials know to those skilled in the art. Parts 103 and 104 are pairs of Faraday rotating material which rotates polarized light clock-wise and counter clock-wise respectively by about 45 degrees, as are parts 107 and 108. Part 105 is a polarization beam splitter (PBS). Its polarizing thin film is at an angle of about 45 degrees from the YZ plane. Glass triangle (GT) 106 is coated with a highly reflective coating. The direction of this reflective coating makes a non-45 degree angle with the YZ plane. Therefore, it is not parallel with the polarizing thin film. GT 106 is not parallel to the polarizing thin film of PBS 105 in order to angle the beam travelling from port 2 to port 3 to dual fiber collimator 100. PBS 105 and GT 106 may be bonded or can be physically separated with an air gap between them if an anti-reflective coating is applied to PBS 105. The bonding material between 105 and 106 could be adhesive or alternatively PBS 105 and GT 106 can be soldered together. The center of the poling thin film is A. The center of the highly reflective coating is B. The distance from A to B ranges from 0.5 to 3.0 mm.

Figure 4A:
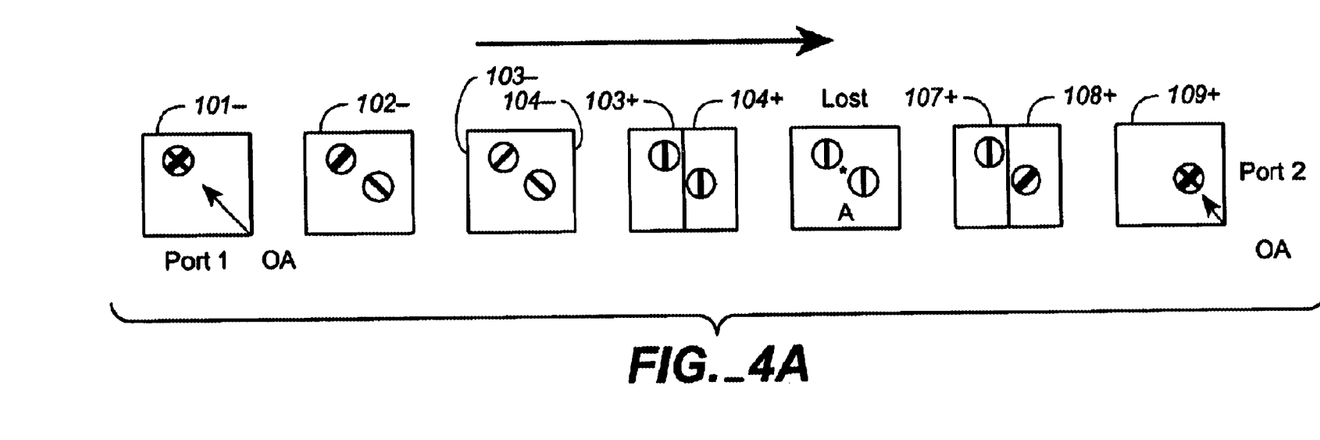
FIGS. 4A and 4B are schematic drawings showing the polarization states and relative positions of light beams at their passage through various interfaces of the circulator of FIG. 2.
Figure 4B:
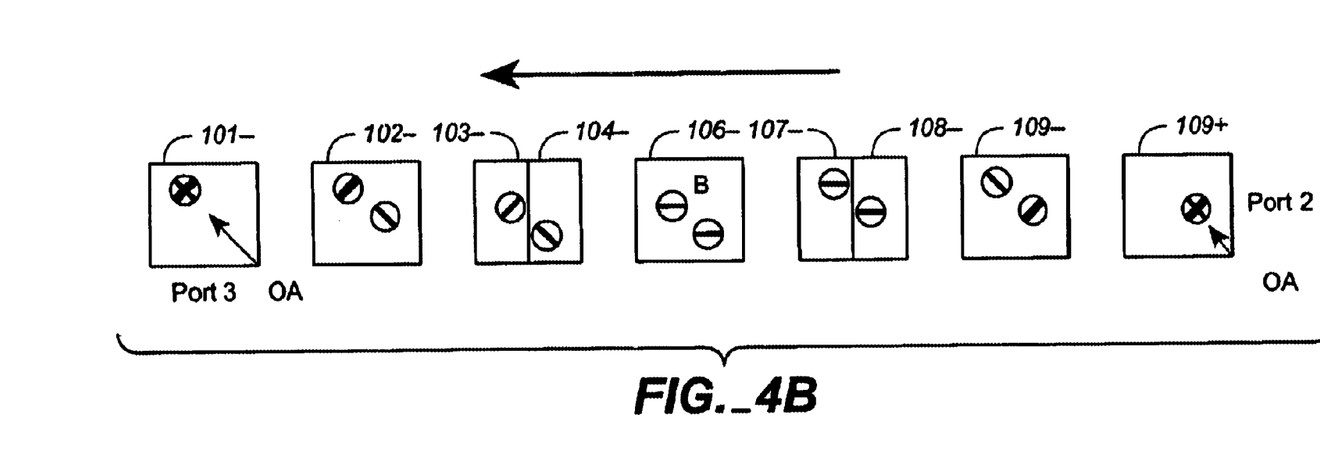

FIGS. 4A and 4B are schematic views of the optical beams through the circulator at the various interfaces, showing the polarization states and relative positions of the beam at the interfaces in the forward direction from port 1 to port 2 and in the reverse direction from port 2 to port 3. FIG. 3 shows the interfaces located on their corresponding components. The sign "−" after the interface number indicates that the a beam first encounters the interface in the forward direction, while the sign "+" indicates that a beam travelling in the reverse direction encounters the interface first. For ample 101− identifies the interface of component 101 that first meets a beam travelling in the forward direction, whereas 101+ identifies the interface of component 101 that first meets a beam travelling in the reverse direction.

The state of polarization (SOP) of the optical signal emerging from port 1 generally can be viewed as two overlapping substantially orthogonally polarized electrical components as shown at interface 101− before the beam has passed through birefringent crystal 101. The two components are then separated by the birefringent crystal 101 into two polarized beams. The polarization direction of the ordinary ray is perpendicular to the optical ads plane (as shown by the thicker line) and the polarization direction of the extraordinary ray is parallel to the optical axis plane (as shown by the thinner line). The relative location of the two beams is shown at interface 102−. After passing through a piece of spacer, the two beams are unchanged as shown at interface 103− and 104−. The two beams pass through a pair of Faraday rotators 103 and 104 which rotate polarization 45 degrees in opposite directions. After that the two beams become vertically polarized as shown at the interface 103+ and 104+. Interface 103+ is located on Faraday rotator 103, and interface 104+ is located on Faraday rotator 104. Their relative position is not changed Then the two beams pass through a piece of polarization beam splitter 105 with the locations and polarization states of the beams unchanged as shown at interface 105+. The two beams then pass through a pair of Faraday rotators 107 and 108 which rotate the polarization of the beams 45 degrees in opposite directions as shown at intercedes 107+ and 108+. Finally, the two beams merge into one after passing through a birefringent crystal 109. This beam is received by collimator 110 at port 2. Note that the port 2 image location is different from port 1 image location.

A circulator is aimed at routing the reverse transmitted light to another port other than port 1. FIG. 4B depicts the SOP and beam location changes of light as transmitted in the reverse path across each optical component along the negative Z-axis as viewed from port 2 to port 3. FIG. 3 shows the interfaces on the various components. The light entering port 2 and entering the crystal 109 is split into two substantially orthogonally polarized beams as shown at interface 109−. The two beams pass through two Faraday rotators 107 and 108 and become horizontally polarized as shown at interface 107− and 108−. Then they are reflected by the polarization beam splitter 105 from A to B and shifted by a distance of 0.5 to 3.0 mm. Then the two beams are reflected again by a reflection mirror 106. The tilting angle, or the angle relative to the YZ plane, is determined to be an approximate value which can create an upward angle of the two beams at the interface 102− of about 2.0 to 5.0 degrees, preferably 2.4 to 3.3 degrees. As shown by FIG. 3, the thin film of the polarization beam splitter and the reflection minor are not parallel. The two beams are shown at the interface 106−. After passing through a pair of Faraday rotators 103 and 104, the two beams are shown at the interface 103− and 104−. Again after passing through a piece of spacer 102, the two beams are shifted upwards at the interface 102− as shown in FIG. 4B, in which case the ordinary ray is a little bit lower than the port 3 location at the interface 101−. The length of the spacer is determined to be a value that causes the ordinary beam to strike interface 101− at the location of dual fiber collimator 100 of FIG. 2, as shown at the interface 101− of FIG. 4A. Me two beams are tilted upwards about 2.0 to 5.0 degrees, preferably about 2.4 to 3.3 degrees. Finally, the two beams are combined by crystal 101 into one beam and received by port 3. Note that port 3 and port 1 each use one of the fibers of dual fiber collimator 100. Thus, only one collimator is required, resulting in a simpler, more compact and economical device.

The preferred embodiment indicated in FIG. 2 is a device of low insertion loss, low polarization dependent loss (PDL), and high isolation. Compared with other circulators, the length between pot 1 and port 2 could be as little as 30 mm. This results in minimal insertion loss. Since port 1 and port 3 employ the same GRIN lens, the cross section is minimized. Furthermore, the angle of the reflection mirror can compensate for the variation of the distance between the two fiber cores of port 1 and port 3. This angle is generally to set to about 2.0 to 5.0 degrees, and preferably to about 2.4 to 3.3 degrees but can be adjusted by the manufacturer to fine tune each device, if necessary, prior to shipment. This minimizes the insertion loss, increase the manufacturability of the device, and increases the production yield compared with other non-tuning circulators. The use of two Faraday rotators with opposite rotating directions eliminate the use of waveplates as seen in other circulators and therefore is more cost effective. This will also reduce the dispersion effect derived from the wave-plate.

Figure 5:
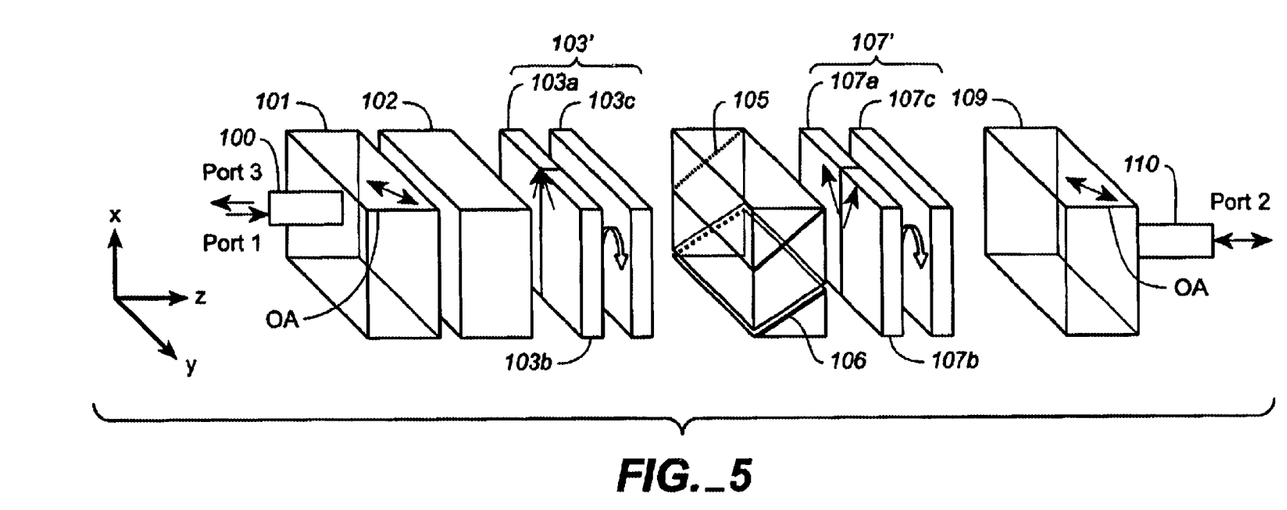
FIG. 5 is a perspective exploded view of the different components of a second embodiment of the optical circulator.

The circulator in FIG. 5 is an alternative embodiment of the circulator in FIG. 2. FIG. 5 is a three dimensional view of the 3 port circulator illustrating the components of this embodiment For convenience purposes, like components have been given the same numbers in all embodiments. This embodiment differs from the first embodiment because the pair of faraday rotators 103 and 104 have been replaced with 103' which includes a pair of half wave plates 103a and 103b together in conjunction with Faraday rotator 103c.

Additionally, Faraday rotators 107 and 108 have been replaced by 107' which includes a pair of half wave plates 107a and 107b together in conjunction with Faraday rotator 107c.

Figure 7A:
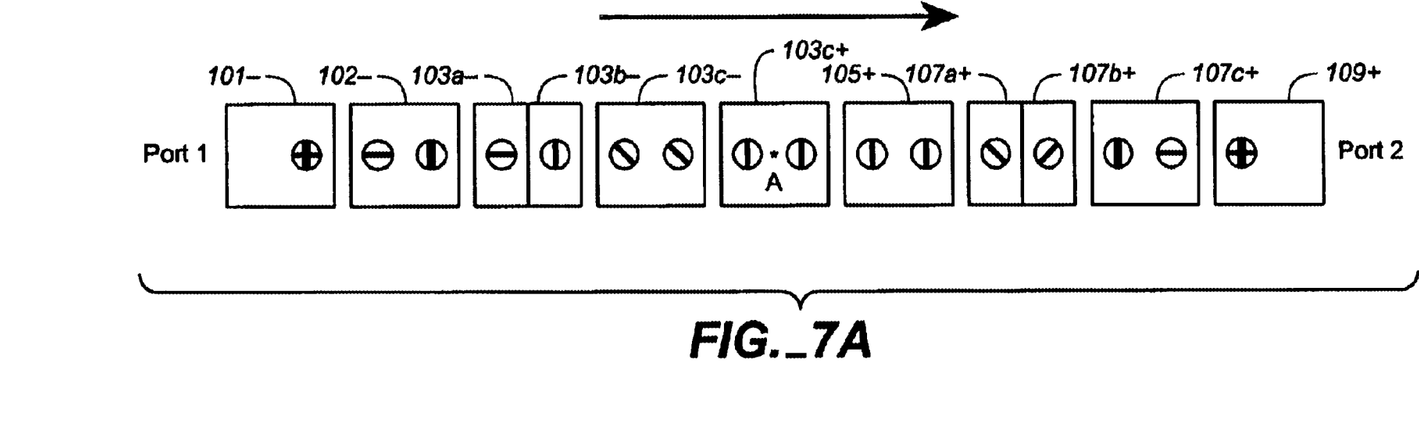
FIGS. 7A and 7B are schematic drawings showing the polarization states and relative positions of light beams at their passage through various interfaces of the circulator of FIG. 5.
Figure 7B:
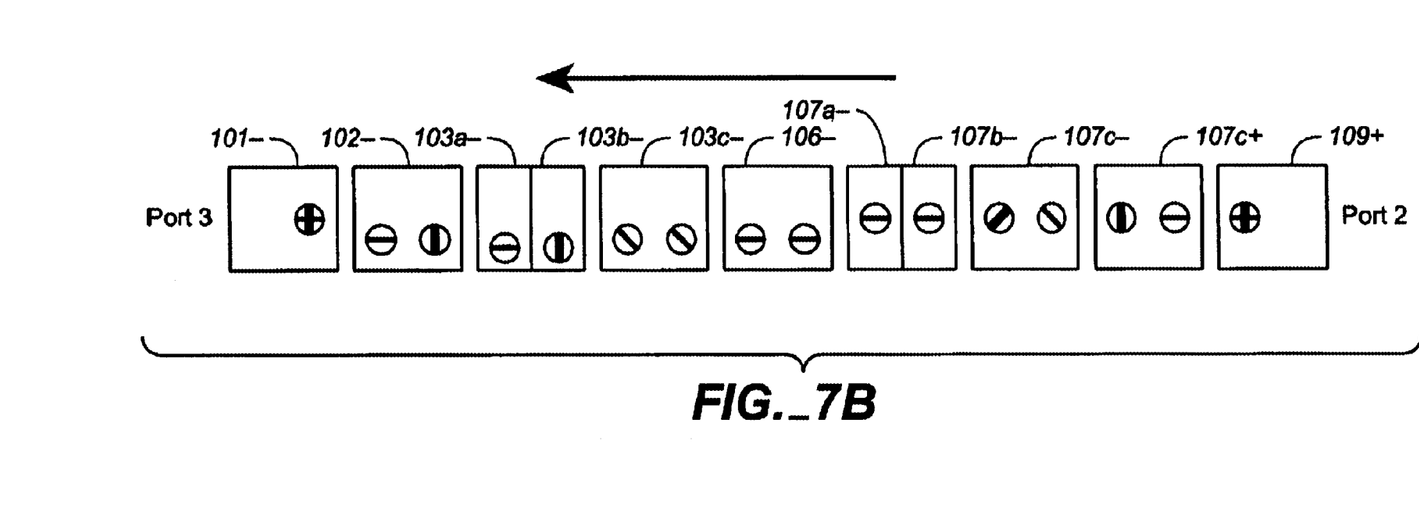

FIG. 7A and 7B are schematic views of the optical beams through the circulator at the various interfaces, showing the polarization states and relative positions of the beam at the interfaces in the forward direction from port 1 to port 2 and reverse direction from port 2 to port 3, respectively.

Figure 6:
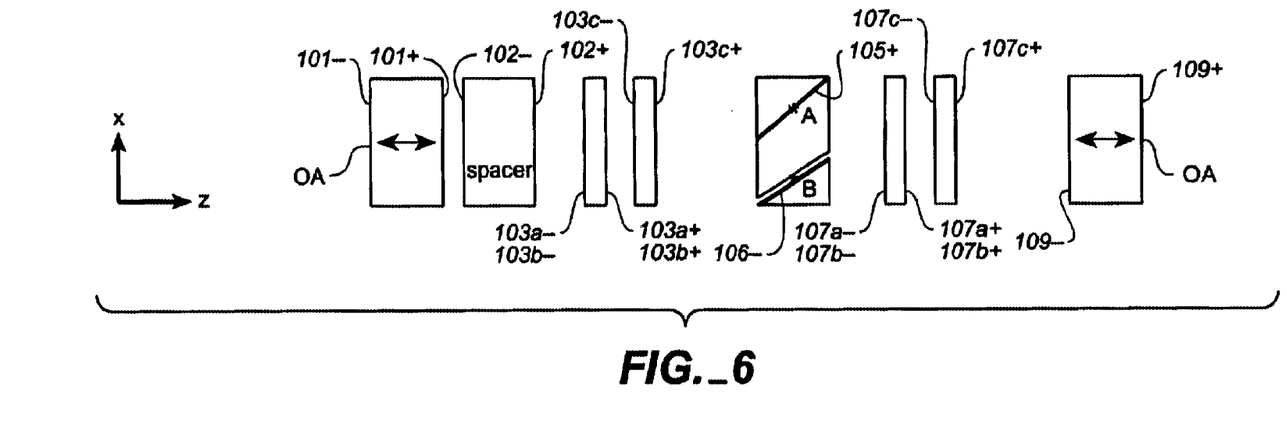
FIG. 6 is a schematic illustration of the second embodiment of the optical circulator viewed from the XZ plane.

The state of polarization (SOP) of the optical signal emerging from port 1 generally can be viewed as two overlapping substantially orthogonally polarized electrical components as shown at interface 101−. The two components are then separated by the birefringent crystal 101 into two polarized beams. The polarization direction of the ordinary ray is perpendicular to the optical axis plane (as shown by the thicker line) and the polarization direction of the extra-ordinary ray is parallel to the optical axis plane (as shown by the thinner line). The relative location of the two beams is shown at interface 102−. After passing through spacer 102, the two beams are unchanged as shown at interface 103a− and 103b−. The two beams pass through a pair of ½ waveplates 103a and 103b and the SOP is shown at 103c−. After passing through the Faraday rotator, the two polarized beams are rotated clockwise by 45 degrees as shown at the interface of 103c+. Their relative location is not changed Then the two beams pass through a piece of polarization beam splitter 105 with their location and polarization unchanged as shown at interface 105+. The two beams then pass through a second pair of ½ waveplates 107a, and 107b and have an SOP 107a+ and 107b+. After passing through the Faraday rotator, the two polarized beams are rotated clockwise by 45 degrees as shown at the interface 107c+. Finally, the two beams merge into one after passing through a birefringent crystal 109. This beam is received and transmitted by collimator 110 at port 2. Note that the port 2 image location is different from the port 1 image location A circulator is aimed at routing the reverse transmitted light to another port other than port 1. FIG. 7B depicts the SOP and beam location changes of light as transmitted in the reverse path across each optical component along the negative Z-axis as viewed from port 2 to port 3. The light exiting port 2 and entering the crystal 109 is split into two substantially orthogonally polarized beams as shown at interface 107c+. The two beams pass through the Faraday rotator 107c and the SOP is shown as 107c−. Then the two beams pass through a pair of ½ waveplates 107a, 107b and the SOP becomes 107a−, 107b−. They are reflected by the polarization beams splitter 105 from A to B and shifted by a distance of 0.5 to 3.0 mm. Again the two beams are reflected by a reflection mirror 106. The tilting angle, i.e. the angle relative to the YZ plane, is determined to be an approximate value which can create an upward angle of the two beams at interface 101− of about 2.0 to 5.0 degrees, preferably about 2.4 to 3.3 degrees. The thin film of the polarization beam splitter and the reflection mirror are not parallel in order to angle the beam relative to the YZ plane as seen in FIGS. 5 and 6. The SOP of the two beams are shown at the interface 106−. After passing through the Faraday rotator 103c, the two beams are shown at interface 103c−. After passing through a pair of ½ waveplates the two polarizations are shown at the interface of 103a− and 103b−. Again after passing through spacer 102, the two beams are shifted upwards as shown at the interface 102− in which case the beams are a little bit lower than the port 3 location at the interface 101−. The length of the spacer will be determined to be a value to make the two beams strike interface 101– at the location of dual fiber collimator 100. Finally, the two beams are combined by crystal 101 into one beam and received by collimator 100 at port 3, where they exit the circulator.

The embodiment indicated in FIG. 5 is a device of low insertion loss, low polarization dependent loss (PDL), and high isolation. Compared with other circulators, the length between the two collimators could be as little as 30 mm. This will help achieve the minimum insertion loss. Because port 1 and port 3 employ the same GRIN lens, the cross section of the device is minimized and the cost is reduced, Furthermore, the adjustability of the reflection mirror in the glass triangle compensates for the variation of the distance between the two fiber cores of port 1 and port 3. This minimizes the insertion loss, increases the manufacturability of the device, and increases the production yield compared with other non-adjustable circulators.

What is claimed is:

1. An optical circulator for transmitting light circularly between input/output ports, comprising:
   a first optical path from a first optical port to a second optical port;
   a second optical path from the second optical port to a third optical port,
   wherein a first beam travels along the first optical path and a second beam travels along the second optical path such that the direction of travel of the first beam is opposite to the direction of travel of the second beam;
   an optical interface in the first and second optical paths that passes the first beams but deflects the second beam to a highly reflective surface,
   wherein the plane of the highly reflective surface is at an angle to the optical interface and such that the second beam is deflected from the highly reflective surface to the third port, and
   wherein the first port and the third port utilize the same GRIN lens.

2. The optical circulator of claim 1 wherein the center of the optical interface ranges from about 0.5 to about 3.0 mm from the center of the highly reflective surface.

3. The optical circulator of claim 1 wherein the angle is about 2.4 degrees to about 3.3 degrees.

4. The optical circulator of claim 1 wherein the first beam has a state of polarization substantially orthogonal to the state of polarization of the second beam.

5. The optical circulator of claim 1 wherein the optical interface is a polarizing thin film.

6. An optical circulation method comprising:
   dividing a light beam traveling in a forward direction from a first port into two substantially orthogonally polarized beams along two different paths, the first port comprising a first lens;
   causing the two substantially orthogonally polarized beams from the first port to have a first polarization state;
   passing the beams having the first polarization state through an optical interface substantially without deflection;
   combining the two passed light beams originally from the first port into one beam in the forward direction to a second port, the second port comprising a second lens;
   dividing a light beam traveling in a reverse direction from the second port into two substantially orthogonally polarized beams along two different paths;
   causing the two substantially orthogonally polarized beams from the second port to have a second polarization state;
   deflecting at the optical interface the beams having the second polarization state;
   combining the two deflected beams originally from the second port into one beam in the reverse direction to a third port using the first lens of the first port.

7. The method of claim 6, said first and second states of polarization being substantially orthogonal to one another.

8. The method of claim 6, wherein said causing rotates the polarization of the two substantially orthogonally polarized beams originally from the first port in a direction that is opposite to that for rotating the polarization of the two substantially orthogonally polarized beams originally from the second port.

9. An optical circulator for transmitting light circularly between input/output ports, comprising:
   first means for receiving a first beam at a first port and transmitting a second beam at a third port;
   second means for receiving the second beam and transmitting the first beam at a second port;
   first means for dividing the first beam into two substantially orthogonally polarized beams and for combining the second beam along two different paths into one beam along the same path;
   second means for dividing the second beam into two substantially orthogonally polarized beams and for combining the first beam along two different paths into one bean along the same path;
   spatial separation means having a first optical interface and a second optical interface in a path or paths between the first and second dividing means, the spatial separation means causing the first beam to pass substantially without deflection and for causing the second beam to be deflected at said first optical interface to the second optical interface,
   wherein said second optical interface deflects the second beam to the third port of the first means such that the first means simultaneously receives the first beam at the first port and transmits the second beam at the third port; and
   means for causing two substantially orthogonally polarized beams from the first beam to have the first polarization state when they reach the spatial separation means and for causing two substantially orthogonally polarized beams from the second beam to have the second polarization state when they reach the spatial separation means.

10. The circulator of claim 9, said first and second states of polarization being substantially orthogonal to one another.

11. The circulator of claim 9, said spatial separation means including at least one polarizing beam splitter.

12. The circulator of claim 9, said second optical interface including at least one mirror.

13. The circulator of claim 9, each of said first and second dividing and combining means comprising a birefringent crystal.

14. The circulator of claim 9, said causing means including means for rotating the polarization of the two substantially orthogonally polarized beams from the first or second means in opposite directions.

15. The circulator of claim 14, said causing means including a Faraday rotator and a pair of half wave plates that rotate polarization of light in opposite directions between the first receiving means and the spatial separation means and a Faraday rotator and a pair of half wave plates that rotate polarization of light in opposite directions between the second receiving means and the spatial separation means.

16. The circulator of claim 14, said causing means including a pair of Faraday rotators that rotate polarization of light in opposite directions between the first means and the spatial separation means and a pair of Faraday rotators that rotate polarization of light in opposite directions between the second means and the spatial separation means.

17. The circulator of claim 15, said first and second dividing means dividing the input beams into beams that are polarized along two substantially orthogonal planes, wherein each of said two half wave plates has an optical axis at an angle of about 22.5 degrees to one of the planes.

18. The circulator of claim 9, said circulator suitable for transmitting light between a first array of n ports on one side of the circulator, said first array comprising the first, third, . . . , (2i−1)th, . . . (2n−1)th port, and a second array of n ports on the other side of the circulator, said second array comprising the second, fourth, . . . , (2i)th, . . . , (2n)th port, n being a positive integer, i being a positive integer less than n, wherein the circulator causes light from the (2i−1)th port to be transmitted to the (2i)th port and causes light from the (2i)th port to be transmitted to the (2i+1)th port.

19. The circulator of claim 9, said circulator suitable for transmitting light between a collimator at a first and a third port on one side of the circulator and a second port on the other side of the circulator, wherein the circulator causes light from the first port to be transmitted to the second port and causes light from the second port to be transmitted to the third port.

20. An optical circulator for transmitting light circularly between input/output ports, comprising:

a first optical element comprising a first lens that receives an input beam and transmits an output beam;

a second optical element comprising a second lens that receives an input beam and transmits an output beam;

a first crystal that divides an input light beam into two substantially orthogonally polarized beams and combines two light beams along two different paths into one beam along the same path;

a second crystal that divides an input light beam into two substantially orthogonally polarized beams and combines two light beams along two different paths into one beam along the same path;

a polarizing beam splitter including a polarizing thin film causing a light beam to pass substantially without deflection when such beam has a first polarization state, and causing the beam to be deflected at the film to a highly reflective surface not parallel with the polarizing thin film when such beam has a second polarization state, wherein the plane of the highly reflective surface is at an angle to the plane of the polarizing thin film such that it is not parallel with the polarizing thin film, and such that the light beam is deflected from the highly reflective surface to the third port of the first optical element.

21. The optical circulator of claim 20 further comprising a pair of Faraday rotators that rotate polarization of light in opposite directions between the first crystal and the polarizing beam splitter and a pair of Faraday rotators that rotate polarization of light in opposite directions between the polarizing beam splitter and the second crystal.

22. The optical circulator of claim 20 further comprising a Faraday rotator and a pair of half wave plates that rotate polarization of light in opposite directions between the first crystal and the polarizing beam splitter and a Faraday rotator and pair of half wave plates that rotate polarization of light in opposite directions between the polarizing beam splitter and the second crystal.

23. The optical circulator of claim 20 wherein the center of the polarizing thin film ranges from about 0.5 to 3.0 mm from the center of the highly reflective surface.

24. The optical circulator of claim 20 wherein the angle of the plane of the highly reflective surface from the plane of the polarizing thin film is about 2.4 degrees or more.

25. The circulator of claim 20, said first and second states of polarization being substantially orthogonal to one another.

26. The circulator of claim 20, said first and second crystals being birefringent crystals.

* * * * *